(12) United States Patent
Yoshikane

(10) Patent No.: US 9,611,060 B2
(45) Date of Patent: Apr. 4, 2017

(54) METHOD AND DEVICE FOR SUPPLYING SPOUT ATTACHMENT BAGS

(71) Applicant: Toyo Jidoki Co., Ltd., Minato-ku, Tokyo (JP)

(72) Inventor: Tohru Yoshikane, Iwakuni (JP)

(73) Assignee: TOYO JIDOKI CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 14/639,678

(22) Filed: Mar. 5, 2015

(65) Prior Publication Data

US 2015/0251859 A1 Sep. 10, 2015

(30) Foreign Application Priority Data

Mar. 6, 2014 (JP) .................................. 2014-43864

(51) Int. Cl.
*B65B 43/18* (2006.01)
*B65B 43/42* (2006.01)
(Continued)

(52) U.S. Cl.
CPC ................ *B65B 43/42* (2013.01); *B31B 1/00* (2013.01); *B65B 3/04* (2013.01); *B65B 3/17* (2013.01); *B65B 43/18* (2013.01); *B65B 43/465* (2013.01); *B65B 61/186* (2013.01); *B65G 47/04* (2013.01); *B65G 47/244* (2013.01); *B65G 47/914* (2013.01); *B31B 2219/024* (2013.01); *B31B 2219/9054* (2013.01)

(58) Field of Classification Search
CPC B65B 61/186; B65B 3/04; B65B 3/17; B65B 43/18; B65B 43/42; B31B 2219/9054; B31B 2219/02
See application file for complete search history.

(56) References Cited

U.S. PATENT DOCUMENTS 7,581,370 B2 * 9/2009 Koga .................... B65B 43/123
198/401
8,371,023 B2 * 2/2013 Kishimoto .............. B31B 19/84
29/430

(Continued)

FOREIGN PATENT DOCUMENTS

JP H7-187202 A 7/1995
JP H8-337217 12/1996

(Continued)

*Primary Examiner* — Thomas Randazzo
(74) *Attorney, Agent, or Firm* — Norton Rose Fulbright US LLP

(57) ABSTRACT

A method and device for supplying spout attachment bags, in which one vertical plane is set as a reference plane N, and the center line (C) of a corner-spout attachment bag (2) positioned at the distal end of a conveyor magazine (7) is located in the reference plane N. A suction cup (28) picks up the bag and is rotated by a specific angle (θ) centered on a vertical rotational axis (O) when being transferred. When the suction cup picks up the positioned bag, the rotational axis is set to a position where a corner opening vertical line (M) that passes through the center of a corner opening (3) of the bag intersects the reference plane N. The bag held by the suction cup is sent to a positioning conveyor and positioned by stoppers (52, 53) with the corner opening vertical line being in the reference plane.

15 Claims, 14 Drawing Sheets

(51) Int. Cl.
    *B65B 61/18*     (2006.01)
    *B65B 3/04*     (2006.01)
    *B65B 3/17*     (2006.01)
    *B65B 43/46*     (2006.01)
    *B31B 1/00*     (2006.01)
    *B65G 47/04*     (2006.01)
    *B65G 47/244*     (2006.01)
    *B65G 47/91*     (2006.01)

(56) References Cited

U.S. PATENT DOCUMENTS

2006/0199716 A1*   9/2006   Tsutsui .................... B29C 65/18
                                                                                  493/87
2014/0083061 A1*   3/2014   Ibaraki .................... B65B 3/02
                                                                                  53/558

FOREIGN PATENT DOCUMENTS

| JP | 3261543 | 3/2002 |
|---|---|---|
| JP | P2004-244085 A | 9/2004 |
| JP | P2007-118961 A | 5/2007 |
| JP | P2009-12800 A | 1/2009 |
| JP | P2010-36913 A | 2/2010 |
| JP | 4566628 | 10/2010 |
| JP | 5112770 | 1/2013 |

\* cited by examiner

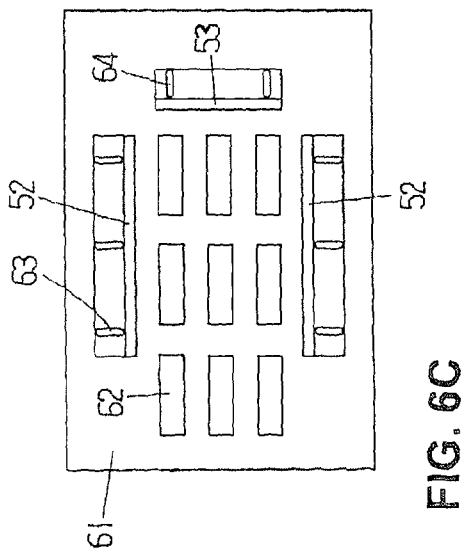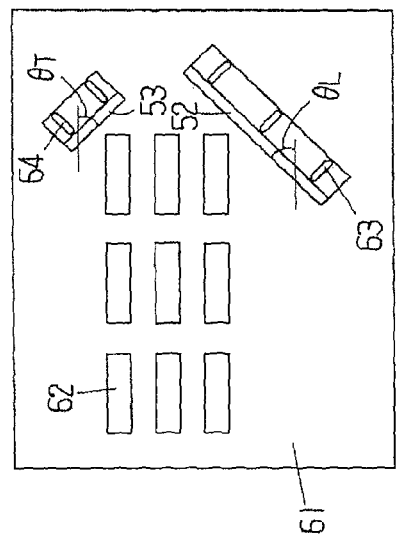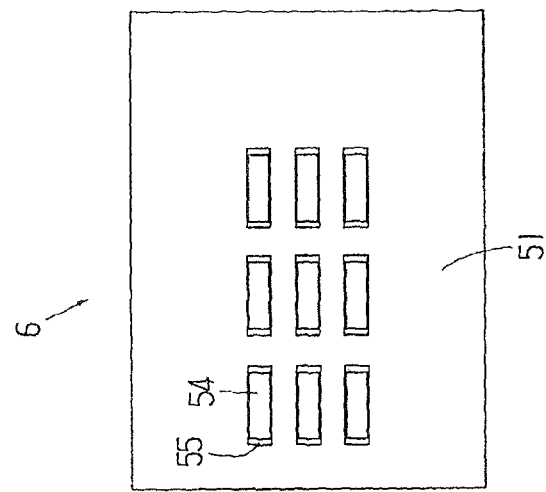

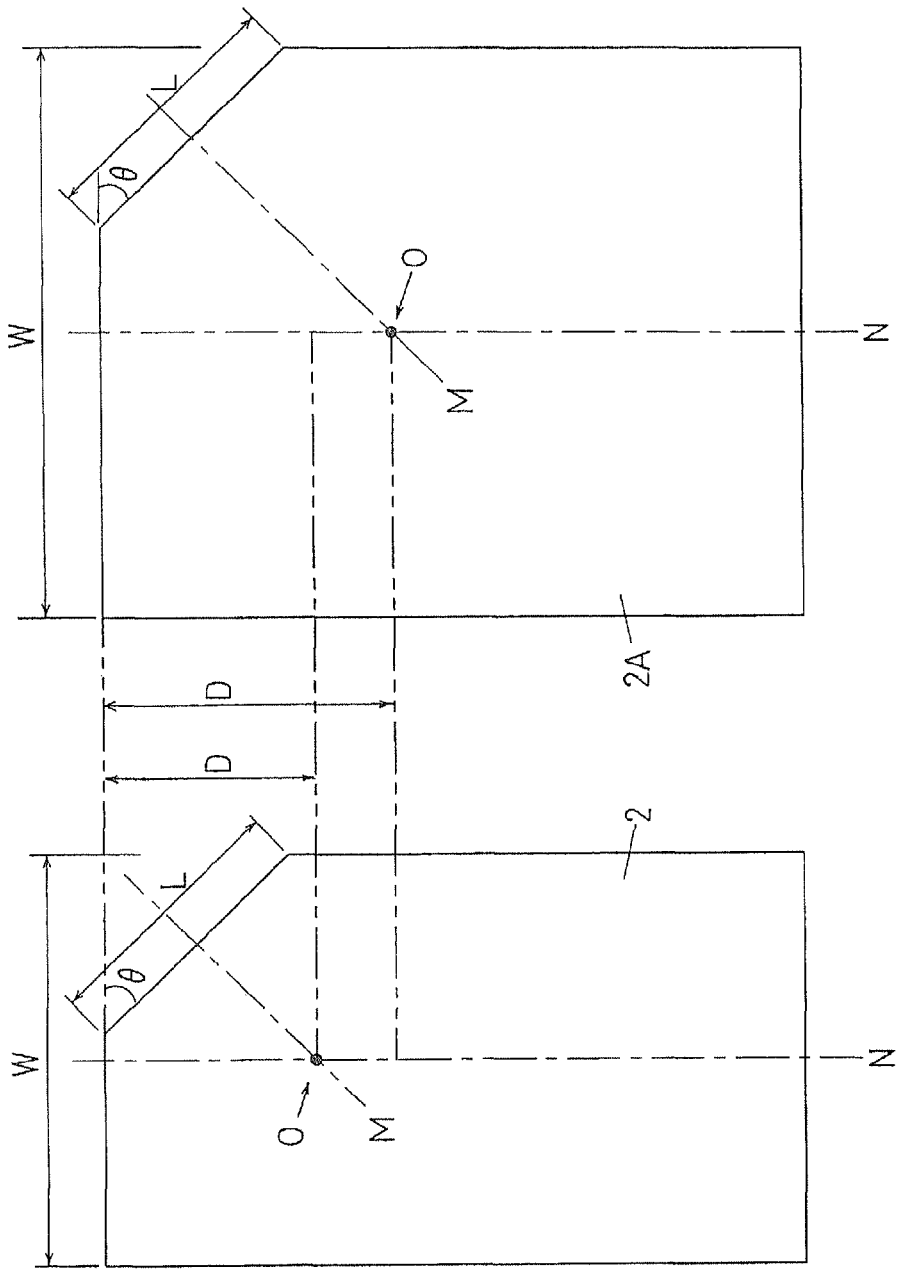

METHOD AND DEVICE FOR SUPPLYING SPOUT ATTACHMENT BAGS

BACKGROUND OF THE INVENTION

1. Field of the Invention

The present invention relates to a method and device for supplying bags to which spouts are to be attached, in which the method and device are applied to a bag supply process when bags to which spouts are to be attached are supplied to left and right grippers of a spout attachment device.

2. Description of the Related Art

Japanese Patent No. 3,261,543 discloses a method for manufacturing a spout equipped bag (a bag equipped with a spout). In this method, bags (bags filled with contents therein, in this art) that have been positioned in a horizontal orientation within an empty bag storage device are switched to a vertical orientation, in which the bag mouth faces upward, and then the bags are supplied to a plurality of pairs of left and right grippers that are provided at a regular spacing along a circular movement path; and further the bags are moved intermittently along the movement path, and then they are intermittently transferred along with the movement of the grippers while the corner part of the mouth part of each one of the bags is cut at an angle, a spout is attached to the corner opening that is angled after being cut, and then a nozzle is inserted into the horizontal portion of the bag mouth to fill the bag with a liquid or content. A spout that is to be attached to the angled corner part of a bag whose basic shape is square is called a corner-spout, and this bag to which a corner-spout is to be attached is called a corner-spout attachment bag.

Japanese Patent Application Laid-Open (Kokai) No. H7-187202 discloses a method for manufacturing a spout equipped bag (a bag filled with content therein, in this art); and in this method, bags that have been taken out of an empty bag storage device are supplied in a substantially vertical orientation, in which the bag mouth faces upward, to the grippers of a bag transfer device having a plurality of pairs of left and right grippers that are provided at a regular spacing along a circular movement path and are moved intermittently along this movement path; and then these bags are intermittently transferred along with the movement of the grippers while a nozzle is then inserted into the bag mouth of each one of the bags so as to fill the bag with a liquid, and then a spout is attached to the center part of the bag mouth which is set horizontally. A spout that is to be attached to the center part of a bag mouth which is substantially parallel to the width direction of the bag whose basic shape is square is called a center-spout, and this bag to which such a center-spout is to be attached is called a center-spout attachment bag.

Japanese Patent No. 4,566,628 describes how a spout (a corner-spout) is attached to the angled mouth of a corner-spout attachment bag, in which the bag is inclined so that the bag mouth is set horizontal and facing upward, and this inclined corner-spout attachment bag is supplied in this state to a spout attachment device. Japanese Patent No. 5,112,770 describes how a spout (a corner-spout) is attached to the angled mouth of a corner-spout attachment bag, in which the corner-spout attachment bag is set in a horizontal orientation, rotated by a specific angle in this state, and then supplied to a spout attachment device.

The methods for manufacturing a spout equipped bag disclosed in Japanese Patent No. 3,261,543 and Japanese Patent Application Laid-Open (Kokai) No. 117-187202 differ in the order of the spout attachment step and the filling step; however, they are same in that the two side edges of a bag are gripped by grippers, the bag is held hanging down with its mouth facing upward, and then the bag is intermittently transferred while a spout is attached to a specific location of the bag mouth during this transfer. Therefore, it can be easily understood that theoretically, the attachment of a corner-spout and the attachment of a center-spout can be performed by the same spout attachment device (a spout equipped bag manufacturing apparatus). It can also be easily imagined that in this spout attachment device (a spout equipped bag manufacturing apparatus), if the portion of process related to spout attachment is stopped, ordinary flat bags and self-standing bags (both without spouts) can be filled and packaged.

However, if the attachment of a corner-spout and the attachment of a center-spout are performed by the same spout attachment device (or by the same spout equipped bag manufacturing apparatus), in actual practice the following problems are encountered.

(1) The form of the bag mouth and the direction in which the spout is supplied are different when attaching a corner-spout from when attaching a center-spout. More specifically, in a corner-spout attachment bag (a bag to which a spout is to be attached to its upper corner portion), the corner opening to which the spout is attached is set angled, and the spout is supplied from diagonally upward. In a center-spout attachment bag (a bag to which a spout is to be attached to its upper center portion), the bag mouth to which the spout is attached is set horizontal, and the spout is supplied to or inserted into the bag from straight up in the vertical direction. Therefore, it is impossible to use a shared or common spout insertion device or spout sealing device to attach both corner-spout and center-spout. It is conceivable that these devices could be replaced when attaching a corner-spout and when attaching a center-spout; however, this replacement work leads to a decrease in productivity.

(2) In the manner of corner-spout attachment disclosed in Japanese Patent No. 3,261,543, as in the case of center-spout attachment disclosed in Japanese Patent Application Laid-Open (Kokai) No. H7-187202, the two side edges of a bag are gripped so that the center line (a straight line passing through the center of the bag in its width direction) of the bag in the left and right grippers is vertical; however, because the corner part of the bag is cut at an angle, the position of the bag with respect to the grippers is higher than when attaching a center-spout. Meanwhile, the surface level of the liquid that has been filled in a bag must be lower than the bottom edge of the grippers. This is because if the surface level of the liquid is above the lower edge of the grippers, the liquid spills out of the bag mouth when spacing of the left and right grippers is increased and the bag mouth is pulled taut prior to being sealed. Therefore, even with bags of the same size, the maximum amount to which a bag can be filled with a liquid is smaller when attaching a corner-spout than when attaching a center-spout, and the volume of the inside of the bag cannot be fully taken advantage of. This means that a bag one size larger may have to be used in some cases.

(3) When a corner-spout is attached, as disclosed in Japanese Patent No. 4,566,628, if a corner-spout attachment bag is inclined so that the corner opening to which the spout is attached is horizontal, and the bag is supplied in this state to the grippers, then the direction in which the spout is supplied to the corner-spout attachment bag can be made vertical as in the case of attaching a center-spout, and also the height position of the corner-spout attachment bag with respect to the grippers can be substantially the same as the height of a center-spout attachment bag. Therefore, the problem discussed in (1) and (2) above can be more or less solved.

Nevertheless, if a corner-spout attachment bag is inclined (rotated along the bag surface) so that the corner opening becomes horizontal and supplied in this state to the left and right grippers, there will be such a problem that the spout attachment device is offset in the horizontal direction from the attachment position of the center-spout (usually in the center of the bag mouth opening). This will be described below with reference to FIGS. 11A through 12B.

First, such a situation is considered that a center-spout attachment bag is positioned in a horizontal orientation at a specific position in a magazine, after which this center-spout attachment bag is supplied to a spout attachment device, and then a spout is attached in the center of the opening at the mouth of this bag. In a center-spout attachment bag, three sides thereof are sealed. In this case, as shown in FIG. 11A, a center-spout attachment bag 1 is positioned horizontally at a specific location in the magazine, the bag is picked up at its surface by a suction cup (not shown), and then the bag q is transferred forward to a specific location along the lengthwise direction of the bag as shown in FIG. 11B. This center-spout attachment bag 1 is then picked up again by another suction cup or held by a chuck, switched to a vertical orientation, and transferred to the left and right grippers of the spout attachment device.

In this transfer process, a single vertical plane is set as a reference plane (the reference plane N), and the center line C in the lengthwise direction of the center-spout attachment bag 1 positioned in the magazine (the straight line that passes through the center of bag 1 in its width direction) is set in the reference plane N. The center line C of the bag does not leave this reference plane N when the center-spout attachment bag 1 is transferred from the specific location in the magazine to the grippers.

Next, another situation is considered that a corner-spout attachment bag, instead of the center-spout attachment bag 1, is positioned at a specific location in a magazine, after which this corner-spout attachment bag is supplied to a spout attachment device, and a spout is attached in the center of the corner opening of the bag. As shown in FIG. 12A, the corner-spout attachment bag 2 is positioned so that the center line C along the lengthwise direction of the bag lie in the reference plane N. In this case, just as in the center-spout attachment bag 1 described above, the positioned corner-spout attachment bag 2 is picked up at its surface by a suction cup and transferred forward, and the suction cup is rotated so that the corner opening 3 of the corner-spout attachment bag 2 face perpendicular to the transfer direction of the corner opening 3 during this transfer process. The rotational angle of the suction cup is the same as the inclination angle θ of the corner opening 3 of the bag 2. The rotational axis O of the suction cup that picks up the corner-spout attachment bag 2 is set to be on the center line C (the reference plane N) along the lengthwise direction of the bag 2, and the rotational axis O is moved over the reference plane N along with movement of the suction cup.

In this example, as shown in FIG. 12B, the corner-spout attachment bag 2 is such that a corner opening vertical line M (a straight line that passes through the center of the corner opening 3 and is perpendicular to the corner opening 3) and the reference plane N are offset by spacing S. Also, even if there is no change in the position of the rotational axis O of the suction cup when it has picked up the corner-spout attachment bag 2 that has been positioned in the magazine, the value of the spacing S will fluctuate variously if the width of the corner-spout attachment bag 2, the inclination angle θ of the corner opening 3, or the length L of the corner opening 3, is different.

Accordingly, when the attachment of a center-spout and the attachment of a corner-spout are performed by the same spout attachment device, a spout insertion device and a spout sealing device that are adjusted for the attachment of a center-spout cannot be used just as they are for attaching a corner-spout, and therefore, either these devices have to be replaced or their positions have to be adjusted, etc., so as to accommodate the attachment of a corner-spout, and this work greatly diminishes the productivity of the spout attachment device. Also, replacing these devices, adjusting their positions and so forth also have to be performed if there is a change in the width of corner-spout attachment bags, the inclination angle θ of the corner opening 3 or the length L of the corner opening 3.

BRIEF SUMMARY OF THE INVENTION

The present invention is made in light of the above problems encountered with prior art, and it is an object of the present invention to provide a spout attachment method and device that can be used for both center-spout and corner-spout, and by way of eliminating offset between the reference plane N and the corner opening vertical line M of a corner-spout attachment bag after rotation, the method and device can be used even when the spout is changed from a center-spout to a corner-spout, or when the width of a corner-spout attachment bag, the inclination angle θ of the corner opening, or the length L of the corner opening are changed.

In the present invention, when attaching a corner-spout to a bag, the rotational axis O of the suction cup is, as shown in FIG. 13A, set to a position where the corner opening vertical line M of a corner-spout attachment bag 2 intersects the reference plane N (which is on the center line C of a bag). With this setting, a corner-spout attachment bag 2 is picked up at its surface by the suction cup and transferred forward (when the rotational axis O is moved over the reference plane N during this transfer); and if the suction cup is rotated by angle θ during this transfer, the corner opening vertical line M, as shown in FIG. 13B, comes to a position that coincides with the reference plane N, so that the offset is eliminated (S=0) and the corner opening 3 faces perpendicular to the transfer direction.

When the top view shape of the bag is changed in regards to, for instance, the width W of a corner-spout attachment bag 2, the inclination angle θ of the corner opening of the bag, or the length L of the corner opening of the bag, then the position of the rotational axis O (or the distance D from the distal end of the bag to the rotational axis O) is also changed. FIG. 14A illustrates a corner-spout attachment bag 2 positioned at a predetermined location in a magazine, and FIG. 14B illustrates another corner-spout attachment bag 2A that is positioned at the same location for its distal or front end as the bag 2. The bag 2A is the same as the bag 2 in terms of the inclination angle θ of the corner opening and the length L of the corner opening; however, the bag width W of the bag 2A is greater than that of the bag 2. Accordingly, the position of the rotational axis O (the distance D from the distal end of the bag to the rotational axis O) differs from each other. Thus, when different corner-spout attachment bags are thus positioned with their distal ends set at the same location, it is necessary to adjust the position of the rotational axis O (the magnitude of the distance D) according to the top view shape of the bag.

The present invention is based on the above concepts.

The object of the present invention is accomplished by a unique manner of the present invention for a method for supplying spout attachment bags (bags to which spouts are to be attached), in which an empty spout attachment bag is positioned in a horizontal orientation, and the positioned bag is picked up by a suction cup and lifted upward, and then the bag is transferred toward a predetermined delivery position while still in a horizontal orientation; and during these steps:

one vertical plane (within an environment the method is executed) is set as a reference plane, the center line of the positioned bag is located in the reference plane, the bag is a corner-spout attachment bag, the suction cup is rotatable centered on a vertical rotational axis, with the rotational axis set always located in the reference plane, the position of the rotational axis when the suction cup picks up the bag is set to a position where a corner opening vertical line that passes through the center of a spout attachment corner opening of the bag intersects the reference plane, the suction cup rotates at a specific angle centered on the rotational axis between the time when the bag is picked up and when the bag is transferred to the delivery position, and the corner opening vertical line of the bag that has arrived at the delivery position is located in the reference plane.

When the corner opening vertical line of the bag is located in the reference plane, the corner opening is perpendicular to the reference plane.

In the present invention, when a corner-spout attachment bag whose corner has not yet been cut is supplied, the "spout attachment corner opening" shall refer to a portion that is supposed to become the corner opening (the part that will become the corner opening when the corner is cut).

The above-described supply method of the present invention can take the following embodiments.

(1) A bag that has arrived at the delivery position is transferred toward a pair of left and right grippers of a spout attachment device in a state that the corner opening vertical line of the bag is kept in the reference plane, and the bag is converted to a vertical orientation in the course of this transfer.

(2) The corner-spout attachment bag is received by a positioning conveyor at the delivery position, the bag is conveyed parallel to the reference plane and within a horizontal plane on the positioning conveyor, and then the bag comes into contact with a stopper at a predetermined position on the conveyance path and is repositioned so that the corner opening vertical line of the bag is located in the reference plane.

(3) In (2) above, the bag that has been positioned on the positioning conveyor is transferred toward a pair of left and right grippers of a spout attachment device in a state that the corner opening vertical line of the bag is kept in the reference plane, and the bag is converted to a vertical orientation in the course of this transfer.

(4) In (1) above, the spout attachment bag includes a corner-spout attachment bag and a center-spout attachment bag, and switching between the supply of corner-spout attachment bag and the supply of center-spout attachment bag is performed by operating a switch of a control device. When a center-spout attachment bag is supplied, that bag is transferred to the delivery position without rotating the suction cup and thus the bag is not rotated.

(5) In (4) above, the spout attachment bag is received by a positioning conveyor at the delivery position, the bag is conveyed parallel to the reference plane and within a horizontal plane on the positioning conveyor, and then the bag hits or comes into contact with a stopper at a predetermined position on the conveyance path and is repositioned. If the bag is a corner-spout attachment bag, it is positioned so that the corner opening vertical line of the bag is located in the reference plane; and if the bag is a center-spout attachment bag, it is positioned so that the center line of the bag is located in the reference plane.

(6) In (5) above, a bag positioned on the positioning conveyor is further transferred toward a pair of left and right grippers of a spout attachment device, and the bag is converted to a vertical orientation in the course of this transfer. If the spout attachment bag is a corner-spout attachment bag, it is transferred in a state that the corner opening vertical line of the bag is kept in the reference plane; and if the bag is a center-spout attachment bag, then it is transferred in a state that the center line of the bag is kept in the reference plane.

(7) In (3) and (6) above, in the spout attachment device, the grippers that grip the left and right sides of a spout attachment bag are moved intermittently along, for example, a circular path, and various spout attachment steps are successively carried out to the bag in the course of this movement. If the spout attachment bag is a corner-spout attachment bag, the spout attachment process includes a step of cutting the corner (forming the corner opening), a step of opening up the corner opening, a step of inserting and temporarily sealing a spout in the corner opening, a step of sealing the bag surface near the spout and the corner opening and sealing the bag surfaces together, and a step of cooling the sealed part. If the spout attachment bag is a center-spout attachment bag, of the steps above, the step of cutting the corner is omitted.

Furthermore, the object of the present invention is accomplished by a unique structure of the present invention for a bag supply device that supplies spout attachment bags, wherein a suction cup that is movable up and down and is able to move along the transfer direction of the bag is provided, and an empty spout attachment bag that is positioned in a horizontal orientation is picked up and lifted upward by the suction cup and then transferred to a predetermined delivery position while still in a horizontal orientation; and in this structure:

one vertical plane (in the bag supply device) is set as a reference plane, the center line of a positioned bag is located in the reference plane, the bag is a corner-spout attachment bag, the suction cup is rotatable centered on a vertical rotational axis, the rotational axis is set so as to be always located in the reference plane, the position of the rotational axis when the suction cup picks up the bag is set to a position where a corner opening vertical line that passes through the center of a spout attachment corner opening of the bag intersects the reference plane, the suction cup is rotated at a specific angle centered on the rotational axis between the time when the bag is picked up and when the bag is transferred to the delivery position, and the specific angle is set so that the corner opening vertical line of the bag that has arrived at the delivery position is located in the reference plane.

The above-described supply device can take the following embodiments.

(1) The supply device includes a control device that, when the suction cup picks up the corner-spout attachment bag, adjusts the angle at which the suction cup rotates and the position at which the rotational axis is located, according to the top view shape of the bag that has the corner opening.

(2) The supply device further includes a positioning conveyor that receives the corner-spout attachment bag and repositions it at the delivery position, the positioning conveyor having a conveyor, on which the bag is placed and which conveys the bag parallel to the reference plane, and a stopper, with which the bag comes into contact at a predetermined position on the conveyance path of the conveyor, so that the bag is positioned by the stopper with the corner opening vertical line of the bag being located in the reference plane.

(3) The spout attachment bag is a corner-spout attachment bag or a center-spout attachment bag, in which when a corner-spout attachment bag is processed, the rotational angle of the rotational axis and the position of the rotational axis when the suction cup picks up the corner-spout attachment bag is set as described above; and when a center-spout attachment bag is processed, the suction cup is not rotated (or a rotational angle of zero).

(4) In (3) above, the supply device includes a control device that sets the angle at which the suction cup rotates and the position of the rotational axis when the suction cup picks up a corner-spout attachment bag according to the top view shape of the bag that includes the corner opening; and in the case of a center-spout attachment bag, the control devices sets the rotational angle of the suction cup to zero.

(5) In (3) and (4) above, the supply device further includes a positioning conveyor that receives the bag and repositions the bag at the delivery position, wherein the positioning conveyor has a conveyor on which the bag is placed and which conveys the bag parallel to the reference plane, and a stopper with which the bag comes into contact at a predetermined position on the conveyance path of the conveyor, and if the bag is a corner-spout attachment bag, the bag is positioned so that the corner opening vertical line of the bag is located in the reference plane; and if the bag is a center-spout attachment bag, then the bag is positioned so that the center line of the bag is located in the reference plane.

(6) In the above bag supply device, the suction cup is provided at the lower end of a vertical support shaft that is rotatetable about the rotational axis, and a first drive source, which moves the support shaft along the reference plane, a second drive source, which moves the support shaft up and down, and a third drive source, which rotates the support shaft, are provided; and the first to third drive sources are controlled by the control device.

According to the bag supply method and device according to the present invention, the attachment of a spout to a bag can be performed by a shared (or common) spout attachment device, even when the spout is changed from a center-spout to a corner-spout, or when the width W of a corner-spout attachment bag, the inclination angle 8 of the corner opening of a bag, or the length L of the corner opening of a bag is changed.

BRIEF DESCRIPTION OF THE SEVERAL VIEWS OF THE DRAWINGS

FIGS. 6A to 6C are top views illustrating an example of a method for adjusting the stopper of a positioning conveyor when the spout attachment bag has been changed in the supply device shown in FIG. 1;

FIGS. 14A and 14B are top views illustrating that the position of the rotational axis of the suction cup needs to be adjusted according to the size of the corner-spout attachment bag.

DETAILED DESCRIPTION OF THE INVENTION

A method and device for supplying spout attachment bags (bags to which spouts are to be attached) according to the present invention will be described below in detail with reference to FIGS. 1 to 10F.

Figure 1:
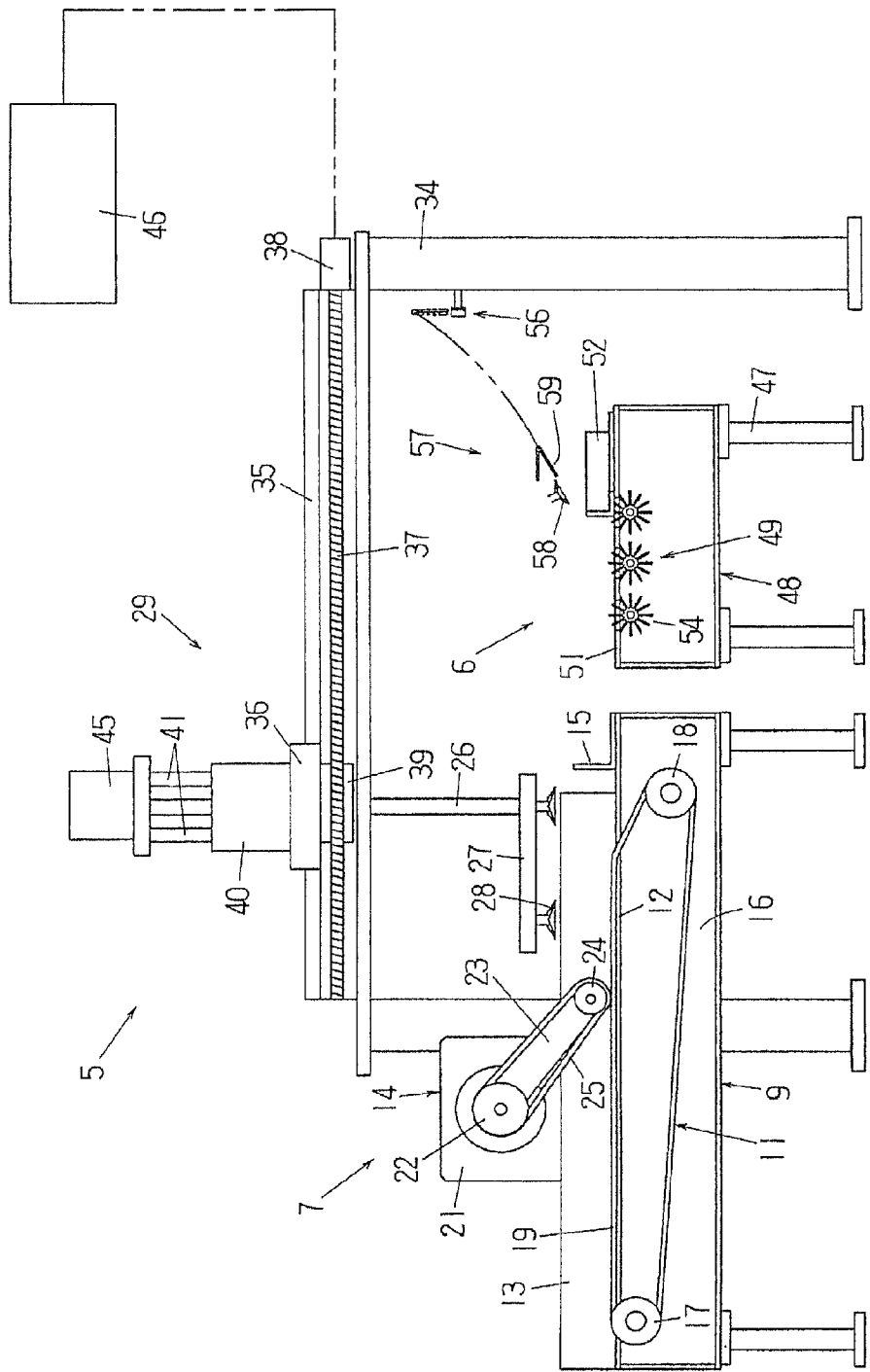
FIG. 1 is a side view of a device for supplying spout attachment bags and a conveyor magazine according to the present invention.

As shown in FIG. 1, the device for supplying spout attachment bags according to the present invention (hereinafter referred to simply as a bag supply device) includes a rotary transfer device 5 and a positioning device 6. A conveyor magazine 7 is provided near the rotary transfer device 5.

Figure 3:
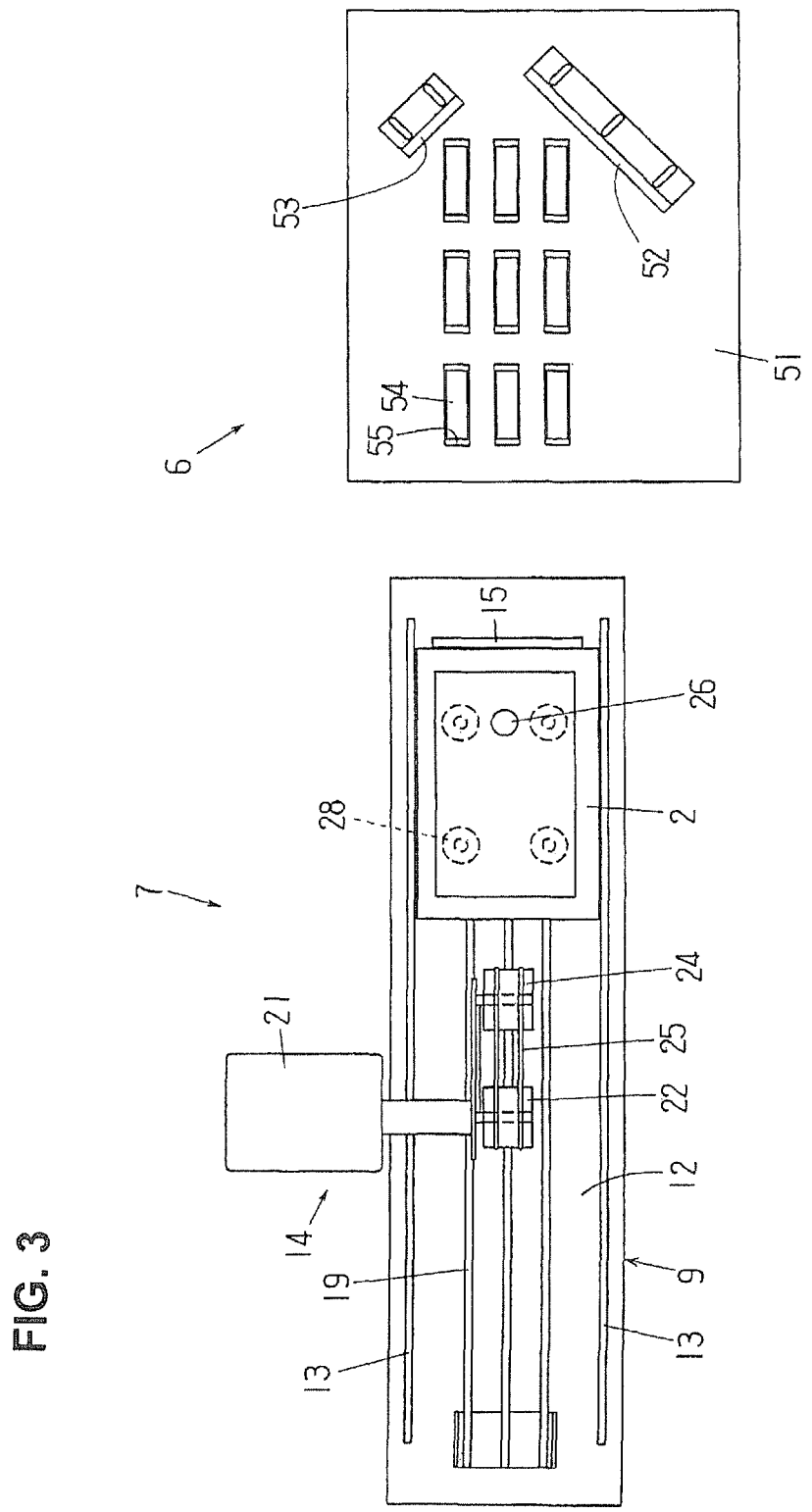
FIG. 3 is a partial top view of the bag supply device and conveyor magazine shown in FIG. 1.

The conveyor magazine 7 is itself already known publicly (see Japanese Patent Application Laid-Open (Kokai) No. 2010-36913, for example), and, as shown in FIGS. 1 and 3, it comprises a conveyor box 9 that is installed on a stand 8, a belt conveyor 11 that is installed in the conveyor box 9, guide plates 13 that are installed on the left and right sides of the belt conveyor 11 and on the upper plate 12 of the conveyor box 9, a quick transfer device 14 that is provided at an upper part of the belt conveyor 11, and a positioning stopper 15 that is installed on the upper plate 12.

The belt conveyor 11 includes pulleys 17 and 18, which are rotatably supported on the left and right side plates 16 (only one side plate is shown in FIG. 1) of the conveyor box 9, and a plurality of belts 19, which are wound around these pulleys 17 and 18. The pulley 18 is linked to and rotated by a drive source (not shown) installed in the conveyor box 9. The upper part of the pulley 17 protrudes from a hole or opening formed in the upper plate 12, and the pulley 18 is provided inside the conveyor box 9 for its entirety. Upon leaving the pulley 17, the belts 19 move forward (toward the right side on the drawing sheet) while sliding over the upper plate 12 and then go into the conveyor box 9 through a hole or opening formed in the upper plate 12 in front of the pulley 18.

The quick transfer mechanism 14 comprises a drive box 21, which is installed on the conveyor box 9 and houses therein a drive mechanism including an internal drive source (motor), a rotating pulley 22, which is connected to the drive mechanism in the drive box 21, a free arm 23, which is attached to the drive box 21 so as to pivot concentrically with the pulley 22, a pulley 24, which is attached to the distal end of the free arm 23, and a quick transfer belt 25, which is wound around the pulleys 22 and 24 attached to the distal end of the free arm 23.

In this conveyor magazine 7, numerous empty bags (of the empty bag group), which are stacked so that the mouths of the bags face forward and the uppermost bag is offset to the front are placed on the belts 19, and these bags are conveyed forward in a horizontal plane by the belts 19 while the left and right edges of the bags are guided by the guide plates 13. These bags are the corner-spout attachment bags 2, and the conveyance direction of the belts 19 is parallel to the lengthwise direction of the corner-spout attachment bags 2. At this stage, the corner opening 3 (see FIG. 4) where the spout is to be attached to the bag 2 has yet to be cut. Therefore, the corner opening 3 referred to here means in particular the site where the corner opening is to be made (the portion that will become the spout attachment corner opening after the corner is cut).

When the uppermost bag of the empty bag group on the belts 19 comes into contact with the quick transfer belt 25, since the moving speed of the quick transfer belt 25 is higher than the moving speed of the belts 19, only the uppermost bag is separated from the bag group and quickly moved forward (to the right side on the drawing sheet), and hen the bag is stopped and positioned when it hits or comes into contact with the positioning stopper 15

In the present invention, as described above, one vertical plane (within an environment the method is executed or within the device) is set as a reference plane N, and a bag that is positioned on the conveyor magazine 7 is positioned so that its center line C (a straight line passing through the center in the width direction) is on the reference plane N. It should go without saying that the same applies to the corner-spout attachment bags 2.

Figure 2:
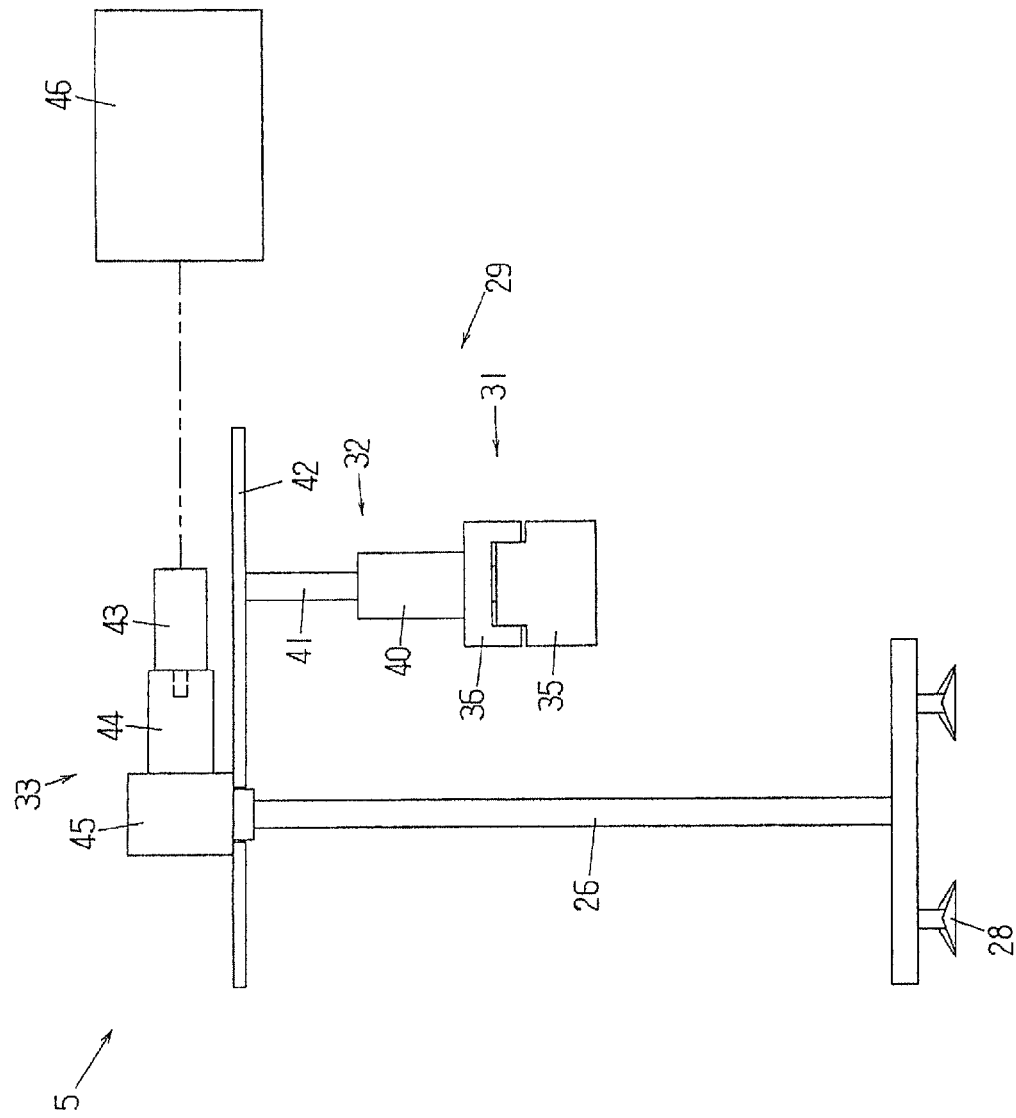
FIG. 2 is a front view of the main components of the bag supply device shown in FIG. 1.

As shown in FIGS. 1 and 2, the rotary transfer device 5 that makes part of the bag supply device comprises a plurality of suction cups 28, which are attached facing downward, via an attachment plate 27, to the lower end of a support shaft 26 that is suspended vertically, and a rotary transfer mechanism 29, which moves the suction cups 28 up and down and backward and forward and further rotates the cups 28 by a specific angle in the course of this backward and forward movement. The rotary transfer mechanism 29 thus includes a linear movement mechanism 31 that moves the suction cups 28 linearly, an elevating mechanism 32 that moves the suction cups 28 up and down, and a rotating mechanism 33 that rotates the suction cups 28 a specific angle. All of these are installed on a stand 34.

The linear movement mechanism 31 of the rotary transfer mechanism 29 is comprised of a linear lane 35 that is horizontal and is installed on the stand 34, a sliding member 36 that is able to slide back and forth along a linear path over the lane 35, a ball screw mechanism that is installed in the interior of the lane 35, and a drive source (servo motor) 38 that rotates a threaded shaft 37 of the ball screw mechanism. The reference number 39 refers to a ball screw nut with a built-in ball, and it is fixed to the sliding member 36.

The elevating mechanism 32 of the rotary transfer mechanism 29 is a drive source (air cylinder) 40 that is installed on the sliding member 36.

The rotating mechanism 33 of the rotary transfer mechanism 29 is installed on an attachment plate 42 fixed to the upper end of a piston rod 41 of the air cylinder 40, and this rotating mechanism 33 is comprised of a drive source (servo motor) 43, a reduction gear 44 that is connected to the servo motor 43, and an axial direction converter 45 that is linked to the reduction gear 44 and converts the direction of the rotational axis from horizontal to vertical. The support shaft 26 of the suction cups 28 is connected to the output shaft of the axial direction converter 45.

The operation of the servo motor 38, the air cylinder 40, and the servo motor 43 is controlled by a control device 46.

In the above-described conveyor magazine 7, when the corner-spout attachment bag 2 hits or comes into contact with the stopper 15 and then is positioned, the suction cups 28 of the rotary transfer device 5 are descend to pick up the corner-spout attachment bag 2. The suction cups 28 are ascended and moved linearly forward a specific distance, and then it is descended at a delivery position (the movement end point for the suctions cups) so as to release the corner-spout attachment bag 2. During this movement, the rotational axis of the support shaft 26, that is, the rotational axis O of the suction cups 28, is located in the reference plane N, and the support shaft 26 (the suction cups 28) rotates at a specific angle centered on this rotational axis O. The fact that the rotational axis O is located in the reference plane N while the suction cups 28 are being moved means that the movement direction of the suction cups 28 (the transfer direction of the corner-spout attachment bag 2) is parallel to the center line C of the positioned corner-spout attachment bags 2 on the conveyor magazine 7.

Figure 4:
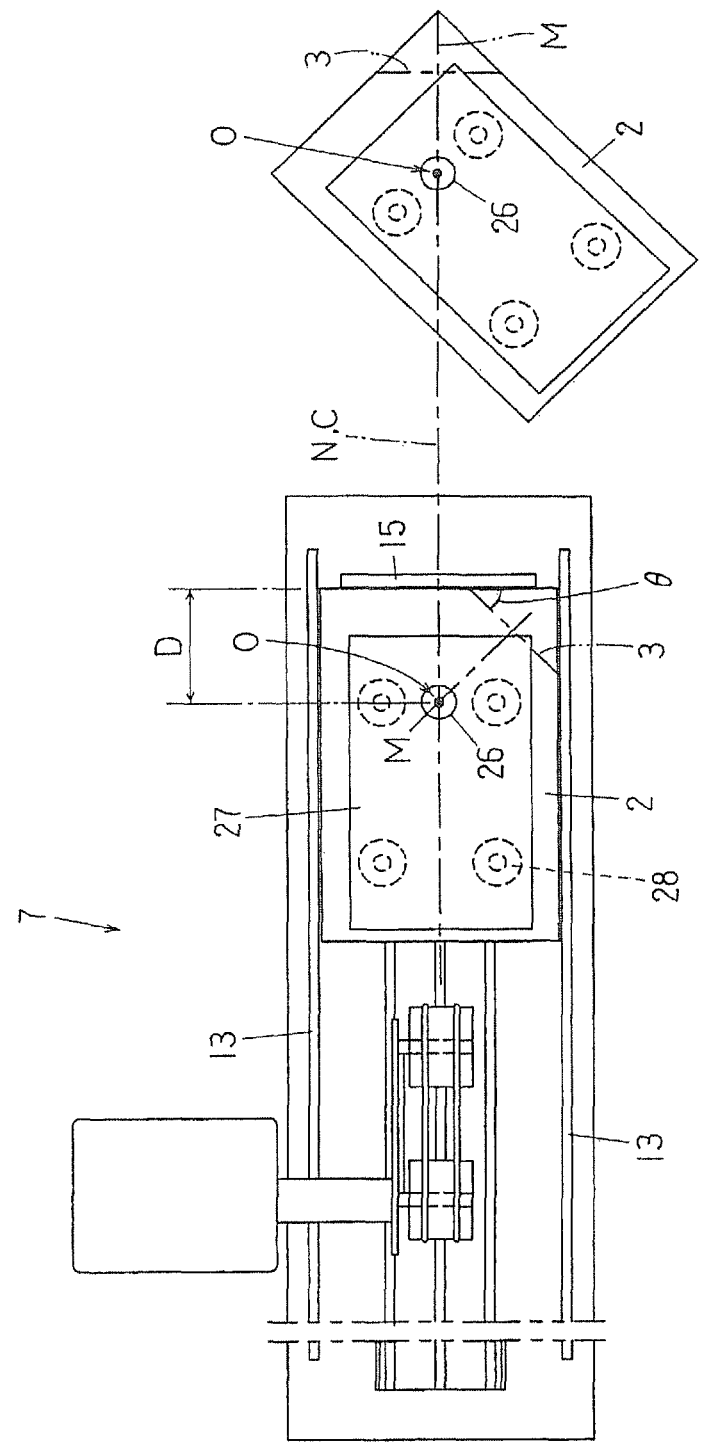
FIG. 4 is a top view illustrating the operation of the bag supply device shown in FIG. 1, in step sequence, with the drawing on the right side showing a support shaft and bag, and a suction cup, that have arrived at the movement end point.

As shown in FIG. 4, the position of the rotational axis O (the initial position) when the suction cups 28 pick up the corner-spout attachment bag 2 is set to be a position at which the corner opening vertical line M that passes through the center of the corner opening 3 of the positioned corner-spout attachment bag 2 intersects the reference plane N (and such position being a position at a distance D from the distal end of the bag 2). The initial position of the rotational axis O (which position being called the magnitude of the distance D) varies depends on the top view shape of a corner-spout attachment bag (and particularly on the bag width W, the inclination angle θ of the corner opening 3, and the length L of the corner opening 3).

The rotation angle θ by which the suction cups 28 are rotated is set to be the same as the inclination angle θ of the corner opening 3 of the corner-spout attachment bag 2.

By way of setting the initial position of the rotational axis O (the distance D) and the rotation angle θ of the suction cups 28 as described above, the corner opening vertical line M of a corner-spout attachment bag 2 that is picked up by the suction cups 28 is located in the reference plane N at the delivery position, and thus the corner opening 3 of the bag is perpendicular to the reference plane N. A corner-spout attachment bag 2 that has reached the delivery position is shown on the right side in FIG. 4.

Figures 11A, 11B:
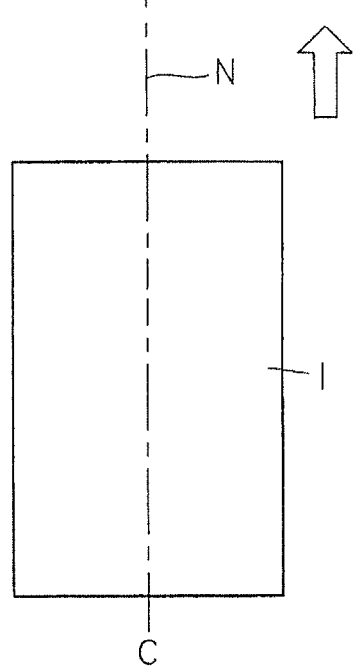
FIGS. 11A and 11B are top views illustrating the transfer of center-spout attachment bags.
Figure 12B:
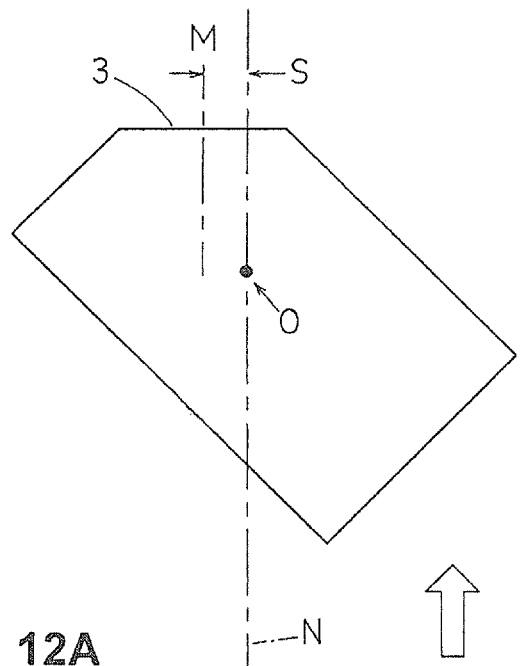
FIGS. 12A and 12B are top views illustrating an issue encountered when a corner-spout attachment bag is rotated during its transfer.
Figure 12A:
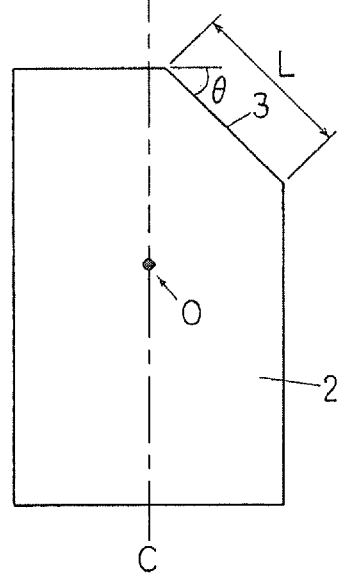

The control device 46 is designed so that the values for the distance D and the rotation angle θ can be set in advance for corner-spout attachment bags having a variety of different top view shapes (and particularly the bag width W, the inclination angle θ of the corner opening 3, and the length L of the corner opening 3) and so that any particular top view shape of particular width, angle and length can be selected by operating a switch. The control device 46 is also designed so that the distance D and the rotation angle θ (θ=0°) values can be set in advance for center-spout engagement bags 1 (see FIG. 11) and so that any desired distance D and/or rotation angle one θcan be selected by switch operation.

The bag supply device of the present invention further includes a positioning device (a positioning conveyor) 6. As seen from FIGS. 1 and 3, the positioning conveyor 6 comprises a conveyor box 48 that is installed on a stand 47, a conveyor 49 that is installed in the conveyor box 48, and positioning stoppers 52 and 53 that are installed on the upper plate 51 of the conveyor box 48.

The conveyor 49 is comprised of rotary brushes 54, which are rotatably supported by the left and right side plates of the conveyor box 48, and a drive source (motor) (not shown), which is installed in the conveyor box 48 and rotates the rotary brushes 54. The rotational axis of each of the rotary brushes 54 (three brushes in the shown example) is set perpendicular to the reference plane N (see FIG. 4 for the reference plane N), the top of the rotary brushes 54 protrudes above holes or opening 55 formed in the upper plate 51; and when a spout attachment bag is put in place on the rotary brushes 54, the rotary brushes 54 conveys the bag parallel to the reference plane N. A roller (such as a roller that is made of rubber for its entirety or for just its outer peripheral face) can also be used instead of the rotary brushes 54.

After being transferred by the suction cups 28 to the delivery position and then placed on the rotary brushes 54 on the positioning conveyor 6, the corner-spout attachment bag 2 is conveyed forward (a short distance) by the rotary brushes 54, and it comes into contact with the stoppers 52 and 53 at a predetermined location on the conveyance path and is positioned thereby.

The conveyance of the corner-spout attachment bag 2 by the positioning conveyor 6 is performed so that the corner-spout attachment bag 2 hits the stoppers 52 and 53 and is repositioned thereby; accordingly, there is no need for a long conveyance distance, and this (short distance conveyance) improves the overall processing capability of the bag supply device. Therefore, the movement end position of the rotational axis O is preferably set so that when the corner-spout attachment bag 2 has reached the delivery position, its distal or front end (the bag mouth opening and the side edges of the bag) is as close as possible to the stoppers 52 and 53. This setting can preferably be performed simultaneously with the setting of the distance D and the rotation angle θ in the above-described switch operation of the control device 46.

Figure 5A:
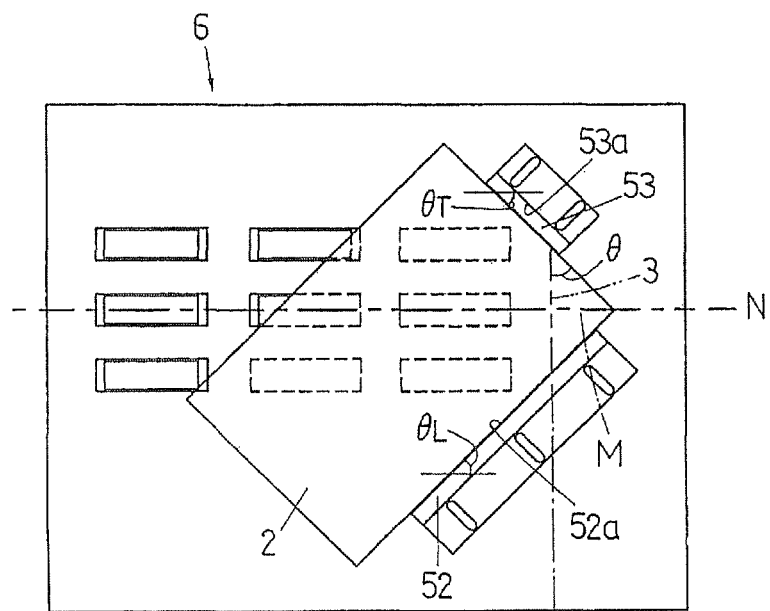
FIGS. 5A and 5B are top views illustrating the operation of the bag supply device shown in FIG. 1, in step sequence.
Figure 5B:
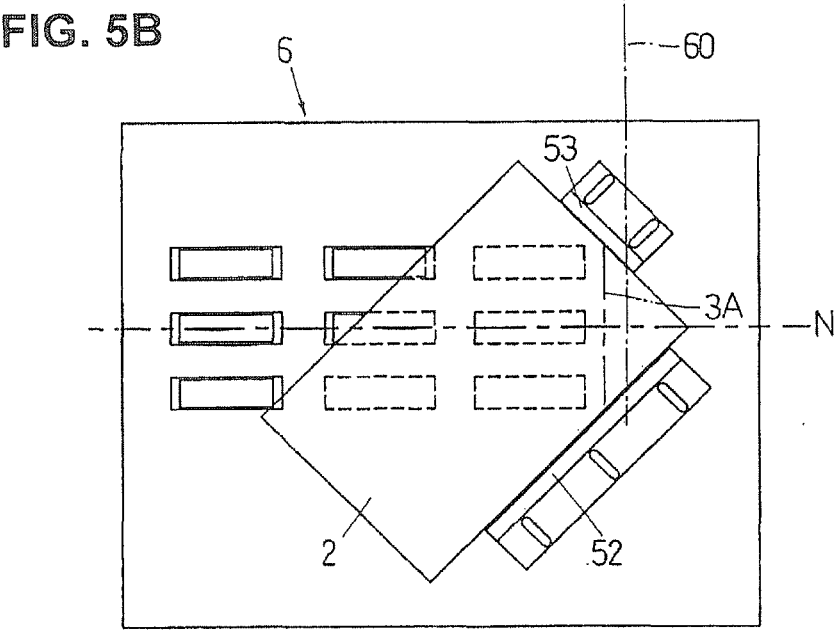
Figure 13B:
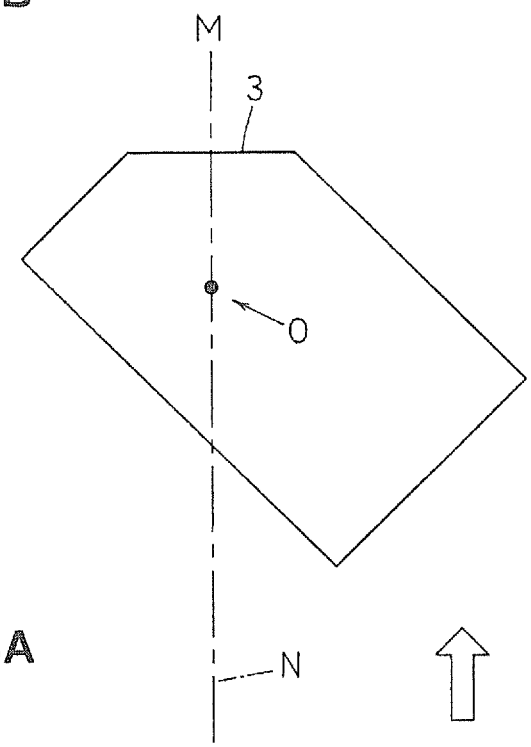
FIGS. 13A and 13B are top views illustrating a means for solving the problem illustrated in FIGS. 12A and 12B.
Figure 13A:
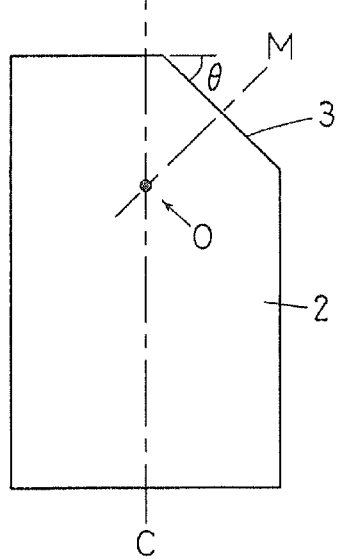

As shown in FIG. 5A, the positioning face 52a of the stopper 52 positions the side edge of the corner-spout attachment bag 2, and the this positioning face 52a is inclined at an angle $\theta_L$ with respect to the reference plane N; while the positioning face 53a of the stopper 53 positions the distal (front) end of the corner-spout attachment bag 2, and this positioning face 53a is inclined at an angle $\theta_T$ with respect to the reference plane N. The angle $\theta_L$ is set to be the same as the inclination angle θ of the corner opening 3 of the corner-spout attachment bag 2 (so as to be $\theta_L=\theta$), and the angle $\theta_T$ is set to be the complementary angle of $\theta_L$ (so as to be $\theta_T=90°-\theta_L$). Also, the left and right positions of the stoppers 52 and 53 (with respect to the reference plane N) are set so that when the corner-spout attachment bag 2 is in contact with the two stoppers 52 and 53 with no gap in between, the corner opening 3 is perpendicular to the reference plane N (see FIG. 13A), and the corner opening vertical line M is located in the reference plane N (see FIG. 13B).

The inclination angles $\theta_L$ and $\theta_T$ must be changed when the inclination angle θ of the corner opening 3 of the corner-spout attachment bag 2 changes (or when a corner-spout attachment bag 2 that has a different inclination angle θ from that of a previously treated bag is to be processed).

On the other hand, if the spout attachment bag to be processed is a center-spout attachment bag 1 (see FIGS. 11A and 11B), two stoppers 52 that position the side edge of the center-spout attachment bag are installed with no inclination with respect to the reference plane N (so that the inclination angle $\theta_L=0°$), and one stopper 53 that positions the distal of end of the center-spout attachment bag is installed perpendicular to the reference plane N (see FIG. 6B); and thus, a center-spout attachment bag 1 that hits or comes into contact with these stoppers and is positioned thereby has its center line C located in the reference plane N.

As shown in FIG. 1, near the above-described positioning conveyor 6, a bag supply device 57 that supplies the corner-spout attachment bag 2 positioned on the positioning conveyor 6 to a pair of left and right grippers 56 of a spout attachment device 74 (see FIG. 9, described later) is provided. This bag supply device 57 includes suction cups 58 and a chuck 59 that move back and forth along their respective predetermined movement paths. The suction cups 58 pick up and lift the corner-spout attachment bag 2 that has been positioned upon hitting the stoppers 52 and 53, and then the chuck 59 clamps or holds the corner-spout attachment bag 2, moves this bag along a predetermined path, changes the bag to a vertical orientation in which the corner opening 3 faces up, and then supplies the bag to the grippers 56. During this movement by the suction cups 58 and the chuck 59, the corner opening vertical line M of the corner-spout attachment bag 2 is kept to be located in the reference plane N, and the corner opening 3 is kept perpendicular to the reference plane N. When the posture of the corner-spout attachment bag 2 is changed to a vertical orientation, the corner opening 3 becomes horizontal.

Also, if the spout attachment bag positioned upon hitting the stoppers 52 and 53 is the center-spout attachment bag 1 (see FIG. 11), then during its movement by the suction cups 58 and the chuck 59, the center line C of this bag 1 is located in the reference plane N, and the opening edge of the bag mouth is kept perpendicular to the reference plane N, and then the opening edge becomes horizontal when the posture of the center-spout attachment bag 1 is changed to a vertical orientation.

The height of the grippers 56 of the bag supply device 57 is fixed, and the movement path of the suction cups 58 and the chuck 59 is also set. Therefore, the height of the corner opening 3 of the corner-spout attachment bag 2 gripped by the grippers 56 is determined by the location (the horizontal position along the reference plane N) of the corner opening 3 of the bag that is positioned upon hitting the stoppers 52 and 53. Also, the height of bag mouth opening 4 (see FIGS. 11A and 11B) of the center-spout attachment bag 1 supplied to the grippers 56 is determined by the location of the bag mouth opening 4 of the center-spout attachment bag 1 that is positioned upon hitting the stoppers 52 and 53 (the horizontal position along the reference plane N).

The height of the corner opening 3 and the height of the bag mouth opening 4 of the spout attachment bag (including both corner-spout attachment bag 2 and center-spout attachment bag 1) clamped or held by the grippers 56 are preferably constant, regardless of the type of bag. This is because if this height changes, then it will be necessary to perform position adjustment and so forth on the various devices that perform the spout attachment steps (such as the corner cutting device discussed below). Therefore, the forward and backward positions and the left and right positions of the stoppers 52 and 53 are preferably adjusted so that when the spout attachment bag (the corner-spout attachment bag 2 or the center-spout attachment bag 1) hits the stoppers 52 and 53 and is positioned, the corner opening 3 or the bag mouth opening 4 of that spout attachment bag is located at a constant position, regardless of the type of bag. For instance, if the corner opening 3 of a corner-spout attachment bag 2 is changed from the position shown in FIG. 5A (the corner opening 3) to the position shown in FIG. 5B (a corner opening 3A), then either the left and right spacing between the stoppers 52 and 53 is increased, or the positions of the stoppers 52 and 53 are moved horizontally forward (to the right side in FIG. 5A or 5B), and the position of the corner opening 3A that has hit the stoppers 52 and 53 comes to the same position as that of the corner opening 3 prior to the change (such position being indicated by the straight line 60, which is perpendicular to the reference plane N).

The series of operations of the bag supply device, etc., described above will be described in time-series fashion, omitting some parts.

(1) In the conveyor magazine 7, of the empty bag group stacked on the belt conveyor 11, the uppermost corner-spout attachment bag 2 is quickly sent forward (or toward the stopper 15), one bag at a time, by the quick transfer device 14, and the distal (front) end of the bag hits or comes into contact with the stopper 15 and then thereby is positioned (see FIG. 4). The center line C of the positioned corner-spout attachment bag 2 is located in the reference plane N.

(2) The suction cups 28 of the rotary transfer device 5 pick up and lift the corner-spout attachment bag 2 that has been positioned by hitting the stopper 15, and then it is moved forward (toward positioning device 6). When the suction cups 28 pick up the positioned corner-spout attachment bag 2, the position of the rotational axis O (of the rotational axis of the support shaft 26, that is, the rotational axis O of the suction cups 28), is, as seen from FIG. 4, set to a position at which the corner opening vertical line M intersects the reference plane N. While the suction cups 28 are moving forward, the rotational axis O is moved over the reference plane N, and the suction cups 28 are rotated at an angle θ centered on the rotational axis O. The angle θ is the inclination angle of the corner opening 3 of the bag 2. Once the corner-spout attachment bag 2 reaches the end point of the movement (which is the delivery position to the positioning conveyor 6), the corner opening vertical line M of the bag 2 is located in the reference plane N, and the corner opening 3 of the bag 2 is perpendicular to the reference plane N (see FIG. 4).

(3) The suction cups 28 are then descended at the delivery position, thus releasing the corner-spout attachment bag 2, so that the bag 2 is placed in a predetermined position on the positioning conveyor 6. The rotary brushes 54 of the positioning device 6 then convey the corner-spout-attachment bag 2 forward, so that the distal or front end of the bag is pressed against the stoppers 52 and 53, and then the bag 2 is again positioned thereby. The corner opening vertical line M of this positioned corner-spout attachment bag 2 is located in the reference plane N, and the corner opening 3 is perpendicular to the reference plane N (see FIG. 5A).

(4) The suction cup 58 of the bag supply device 57 next picks up and lifts the corner-spout attachment bag 2 that has been positioned by hitting the stoppers 52 and 53, the chuck 59 then clamps or holds the bag 2, the bag is changed by the chuck 59 to a vertical orientation in which the corner opening 3 faces up, and the bag is supplied to the pair of left and right grippers 56. The grippers 56 grip the left and right sides of the corner-spout attachment bag 2, at which point the corner opening 3 becomes horizontal, and the center of the corner opening 3 is located in the center of the left and right grippers 56. If, however, the setting of the spout attachment position should deviate from the center of the corner opening, etc., then the center of the left and right grippers 56 may be shifted from the reference plane N, so that the center of the corner opening 3 is thus shifted from the center of the left and right grippers 56.

In the example described above, the stoppers 52 and 53 are installed on the upper plate 51 of the conveyor box 48 of the positioning device 6; however, as seen from FIGS. 6A through 6C, it can be designed so that a plurality of positioning plates 61 on which the stoppers 52 and 53 are installed at various inclination angles ($\theta_L$ and $\theta_T$) are used. These positioning plates 61 are replaced on the upper plate 51 so as to be used every time the spout attachment bags being supplied are changed in order to comply with the type of the changed corner-spout attachment bags. These positioning plates 61 are stacked up on the upper plate 51 (see FIG. 6A), and holes or opening 62 through which the rotary brushes 54 protrude are formed at positions corresponding to the openings 55 formed in the upper plate 51.

The positioning plate 61 shown in FIG. 6B is an example on which the pair of stoppers 52 and 53 are provided without any angle (in other words, $\theta_L=0°$, and $\theta_T=0°$), and this corresponds to center-spout attachment bags 1, so that this positioning plate 61 is used for center-spout attachment bags 1. Slots 63 are formed in the stopper 52, and these slots 63 are utilized to change the positions of the stoppers 52, so as to accommodate center-spout attachment bags of various sizes. Slot 64 are also formed in the stopper 53 so that the positions of the bag mouth openings of the center-spout attachment bags 1 can be adjusted when the center-spout attachment bag 1 hits the stopper 53.

The positioning plate 61 shown in FIG. 6C is an example in which the stoppers 52 and 53 are each installed at an angle, and this corresponds to corner-spout attachment bags 2 so that this positioning plate 61 is used for corner-spout attachment bags 2. Slots 63 and 64 are formed in the stoppers 52 and 53, and the positions of the corner openings 3 when the center-spout attachment bag 1 hits the stoppers 52 and 53 can be adjusted by moving the stoppers 52 and 53 in the lengthwise direction of the slots 63 and 64. Also, these slots 63 and 64 can be used to adjust the inclination angle of the stoppers 52 and 53; and if the inclination angle θ of the corner opening 3 of the corner-spout attachment bag 2 is only slightly different, different corner-spout attachment bags can be accommodated.

FIGS. 7A through 8B show another positioning conveyor 6A. In FIGS. 7A through 8B, those components that are basically the same as those of the positioning conveyor 6 shown in FIGS. 1 and 3 are numbered the same.

A movement mechanism 65 that moves the rotary brushes 54 parallel to their rotational axis is installed in the conveyor box 48 of the positioning conveyor 6A, and the rotary brushes 54 are installed in this movement mechanism 65.

The movement mechanism 65 is comprised of a rail 67 installed horizontally on the lower plate 66 of the conveyor box 48 and parallel to the rotational axis of the rotary brushes 54, a sliding member 68 that slides over the rail 67, a support member 69 that is installed on the sliding member 68, and a drive source (air cylinder, etc., not shown) that moves the sliding member 68 along the rail 67. Both ends of the rotary shafts 71 of the rotary brushes 54 are rotatably supported by the vertical walls 69a of the support member 69 and are rotated by a drive source (motor, not shown).

The positioning plate 61 is installed on the upper plate 51 of the conveyor box 48.

As the sliding member 68 slides, the rotary brushes 54 are moved in the same direction. The openings 55 formed in the upper plate 51 and the openings 62 formed in the positioning plate 61 are formed somewhat wider in the movement direction of the rotary brushes 54 as compared to the positioning conveyor 6, which allows the rotary brushes 54 to move within the openings 55.

Figure 7A:
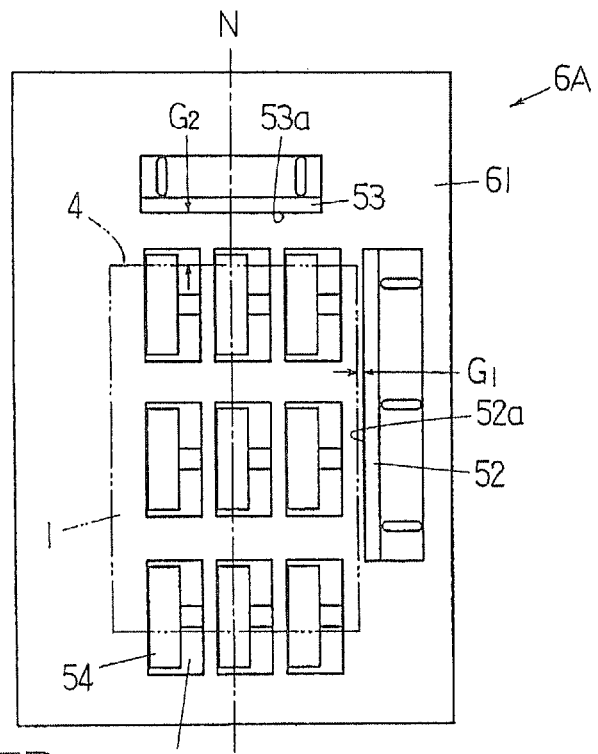
FIG. 7A is a top and FIG. 7B is a rear view prior to positioning with another positioning conveyor according to the present invention.
Figure 7B:
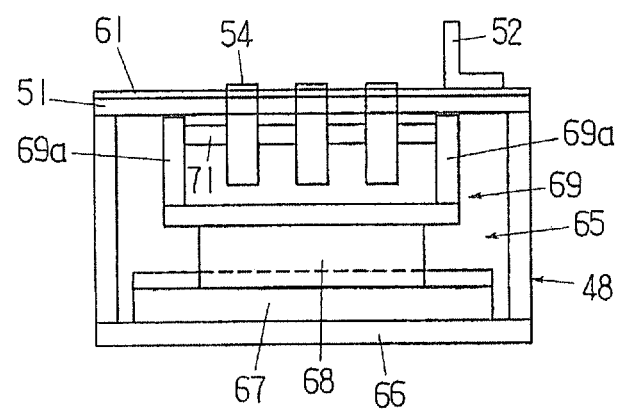
Figure 8A:
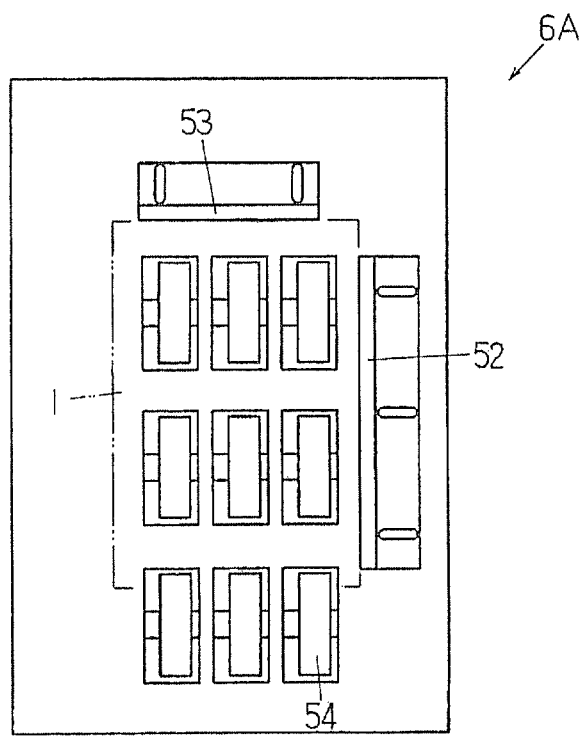
FIG. 8A is a top view and FIG. 8B is a rear view after positioning with another positioning conveyor according to the present invention.
Figure 8B:
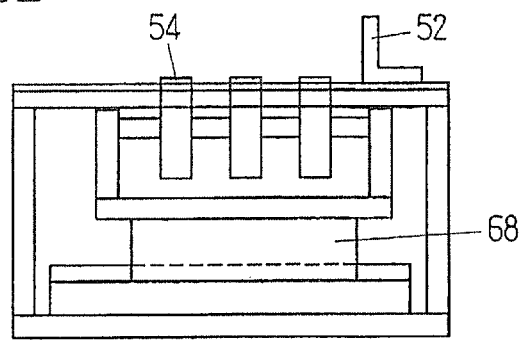

The stopper 52 (for only on one side) and the stopper 53 for positioning the center-spout attachment bag 1 are provided on the upper face of the upper plate 51. As shown in FIG. 7A, when the center-spout attachment bag 1 transferred to the delivery position is placed on the positioning conveyor 6A, the rotary brushes 54 are at the position farthest away from the stopper 52.

When the center-spout attachment bag 1 is placed on the positioning conveyor 6A, one side edge of the center-spout attachment bag 1 is located at a position that is separated by spacing G1 from the positioning face 52a of the stopper 52, and the distal or front end (the bag mouth opening 4) of the center-spout attachment bag 1 is located at a position that is separated by spacing G2 (the spacing G2 is the same in the positioning conveyor 6) from the positioning face 53a of the stopper 53. In other words, the delivery position for the bag 1 is set so that the spacing between the positioning face 52a of the stopper 52 and one side edge of the center-spout attachment bag 1 is G1, and the spacing between the positioning face 53a of the stopper 53 and the distal end of the center-spout attachment bag 1 is G2.

When the center-spout attachment bag 1 is placed on the positioning conveyor 6A, this center-spout attachment bag 1 is conveyed forward by the action of the rotary brushes 54, and is positioned when the distal end (the bag mouth opening 4) hits the positioning face 53a of the stopper 53. The sliding member 68 is moved during positioning by the stopper 52. The sliding member 68 (and the rotary brushes 54) are moved to the stopper 52 side at a specific timing after the center-spout attachment bag 1 is placed on the positioning conveyor 6A, and one side edge of the bag 1 on the rotary brushes 54 hits or comes into contact with the positioning face 52a of the stopper 52 to position the bag (see FIG. 8A). As described above, a rubber roller can be used instead of the rotary brushes 54 to increase the friction with the center-spout attachment bag 1 and allow the bag 1 to be moved more easily to the stopper 52 side.

The center line C of the center-spout attachment bag 1 positioned by the stoppers 52 and 53 is offset from the reference plane N by spacing G in the bag width direction. However, because this spacing G can be set extremely small, the center line C of the center-spout attachment bag 1 positioned by the stoppers 52 and 53 can be said so that it is substantially located in the reference plane N. On the other hand, if greater precision is required, as long as the spout attachment bag is the center-spout attachment bag 1, the initial position of the center line C (the position when the bag has been positioned by hitting the stopper 15 of the conveyor magazine 7) can also be offset from the reference plane N by spacing G ahead of time. In this case the center line C of the center-spout attachment bag 1 positioned by the stoppers 52 and 53 will be located in the reference plane N.

An example of an apparatus for manufacturing a spout equipped bag that includes the bag supply device according to the present invention will be described below with reference to FIGS. 9 to 10F.

Figure 9:
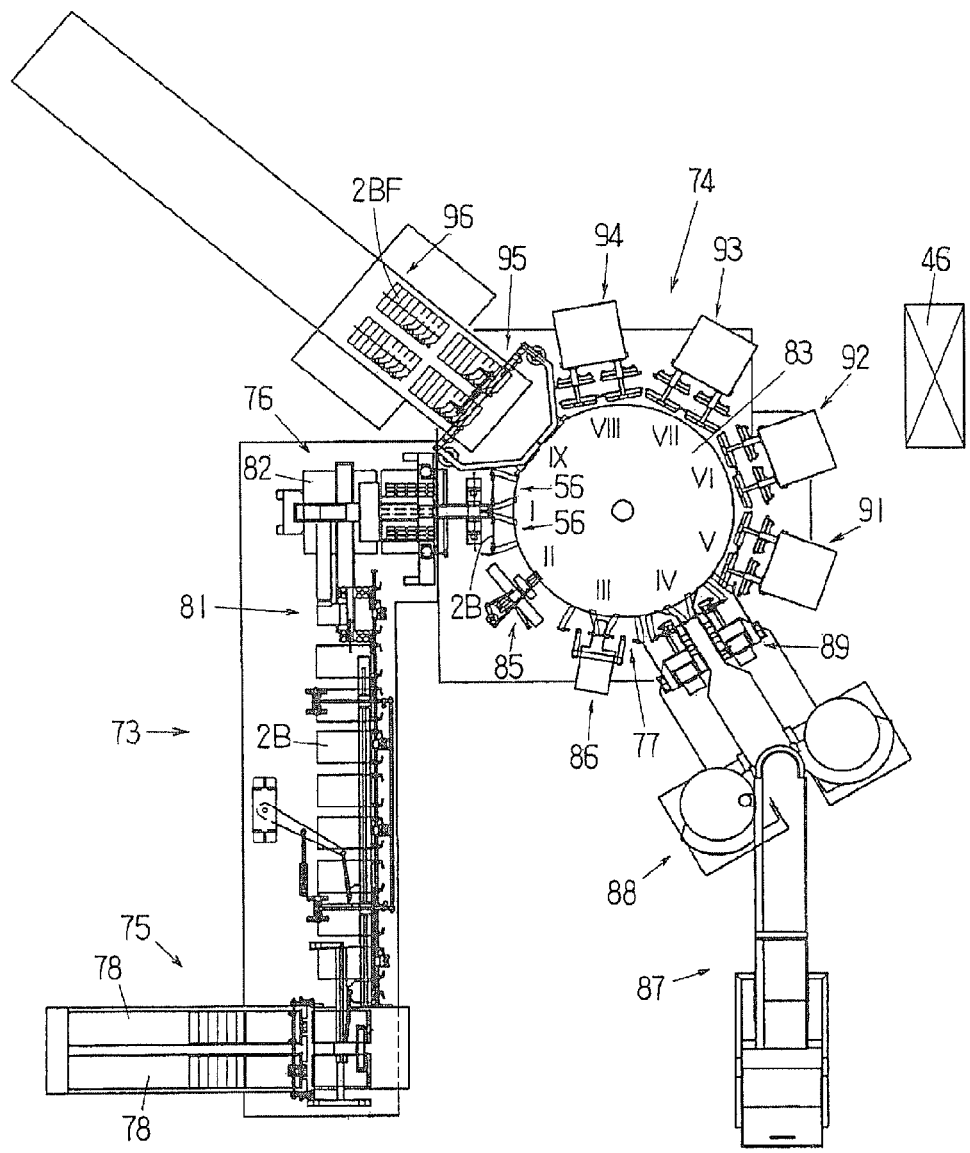
FIG. 9 is an overall top view of an apparatus for manufacturing spout equipped bags in which the device for supplying spout attachment bags according to the present invention is employed.

The apparatus for manufacturing a spout equipped bag shown in FIG. 9 includes a gas injection and sealing device 73 that blows gas into an airbag portion of a spout attachment bag and then seals the air bag, a spout attachment device 74 that attaches a spout to the spout attachment bag, a bag supply device 75 that supplies the spout attachment bag to the gas injection and sealing device 73, and a bag supply device 76 according to the present invention, which is installed between the gas injection and sealing device 73 and the spout attachment device 74.

The spout attachment device 74 is a double attachment type, in which various kinds of devices (described below) for carrying out spout attachment operations are provided around a double rotary bag transfer device 77 (see Japanese Patent Application Laid-Open (Kokai) No. 2004-244085, for example, for such a double attachment type spout attachment device). Two bags are simultaneously and intermittently transferred by the rotary bag transfer device 77 along a circular movement path, and the two bags are subjected to various spout attachment operations at each stop position.

The bag supply device 75 includes two conveyor magazines 78 provided in parallel, and a total of two positioned bags are transferred to the distal ends of these conveyor magazines 78 at a predetermined site (initial position) on the line of the gas injection and sealing device 73.

The bags transferred by the bag supply device 75 are corner-spout attachment bags 2B in this example (see FIG. 10A), in which an airbag portion 79 is formed in the up and down direction along one sealed edge of the bag, and an inlet opening is formed at the upper end. A bag that is thus formed with an airbag portion is disclosed in, for example, Japanese Patent Application Laid-Open (Kokai) Nos. 2009-12800 and 2007-118961.

In the gas injection and sealing device 73, the corner-spout attachment bags 2B supplied from the bag supply device 75 are intermittently transferred in pairs in a horizontal plane; and during this transfer, a gas is blown into the airbag portion 79 from the inlet opening, and then the inlet opening is sealed to trap the pressurized gas inside the airbag portion 79.

Japanese Patent Application Laid-Open (Kokai) Nos. 2009-12800 and 2007-118961 discloses methods and apparatus in which a gas is blown into the airbag portion 79, and the airbag portion is then sealed. The methods and apparatus disclosed in these publications 2009-12800 and 2007-118961 all involve a vertical type (in which the edges of the bag are clamped or held by left and right grippers, and the bag is transferred intermittently while hanging down vertically while a gas is blown into the airbag portion and the airbag portion is sealed); however, such methods and apparatuses is applicable to the gas injection and sealing device 73 by switching to a horizontal type (in which the bag is transferred intermittently in a horizontal plane while a gas is blown into the airbag portion and then the airbag portion is sealed).

The two corner-spout attachment bags 2B in which a gas has been sealed in its airbag portion 79 by the gas injection and sealing device 73 are simultaneously lifted by a bag transfer device 81 from the end of the line of the gas injection and sealing device 73, and they are positioned horizontally at a predetermined location on an extension of this line (on a positioning plate 82). At this point the corner of the corner-spout attachment bags 2B has not been cut yet.

The bag supply device 76 is the bag supply device illustrated in FIGS. 1 to 3 (the rotary transfer device 5 and the positioning conveyor 6), and two of these are provided in parallel. As described with reference to FIGS. 1 to 5B, the bag supply device 76 is configured so that the corner-spout attachment bags 2B positioned on the positioning plate 82 are picked up by the suction cups 28 of the rotary transfer device 5, rotated by an angle θ in a horizontal plane in the course of being transferred, and then conveyed by the positioning conveyor 6. The corner-spout attachment bags 2B conveyed by the positioning conveyor 6 are positioned upon hitting the stoppers 52 and 53. The rotational angle θ, as described above, coincides with the inclination angle of the corner opening of the corner-spout attachment bags 2B (the site where the corner opening is to be made).

The rotary bag transfer device 77 of the spout attachment device 74 has pairs of grippers 56 (a total of 18 pairs) spaced apart at a constant angle around a table 83 that rotates intermittently. Each pair of grippers 56 is intermittently rotated by a constant angle along a circular movement path and stopped nine times during one rotation. The corner-spout attachment bags 2B gripped by the grippers are subjected to various spout attachment steps by various devices provided at each one of the stop positions.

Figure 10C:
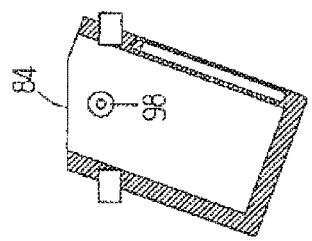
FIGS. 10A to 10F illustrate the sequence of the spout attachment steps performed by the spout attachment device of an apparatus for manufacturing spout equipped bags.
Figure 10F:
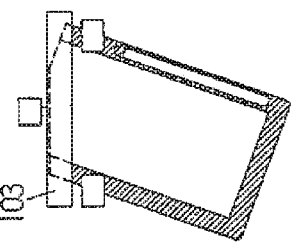
Figure 10B:
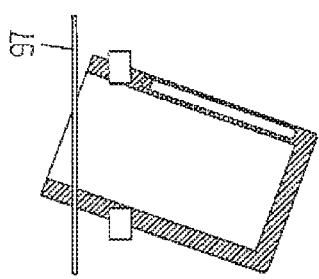
Figure 10E:
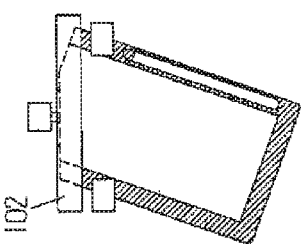
Figure 10A:
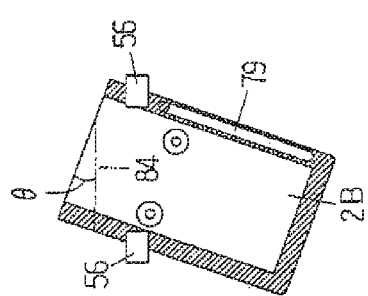

The corner-spout attachment bags 2B that are positioned by hitting the stoppers 52 and 53 of the positioning conveyor 6 are next supplied in a vertical orientation simultaneously (two at a time) to the two pairs of grippers 56 by the suction cups 58 and the chuck 59 of the bag supply device 57 (see FIG. 10A). The corner-spout attachment bags 2B gripped by the grippers 56 are inclined at the angle θ, and its corner opening 84 (the site where the corner opening is to be made) is horizontal.

The first stop position of the grippers 56 (stop position I) is a stop position to which the corner-spout attachment bags 2B are supplied from the bag supply device 57, and a corner cutting device 85 is provided near the second stop position (stop position II) with an opening device 86 being provided near the third stop position (stop position III). A spout supply conveyor 87, a part feeder 88, and a spout insertion and temporary filling device 89 are provided near the fourth stop position (stop position IV), a first sealing device 91 is provided near the fifth stop position (stop position V), a second sealing device 92 is provided near the sixth stop position (stop position VI), and a third sealing device 93 is provided near the seventh stop position (stop position VII). Further, a cooling device 94 is provided near the eighth stop position (stop position VIII), and a bag discharge device 95 and a conveyor 96 are provided near the ninth stop position (stop position IX).

The control device 46 shown in FIG. 1 controls all of the devices that form the apparatus for manufacturing a spout equipped bag, such as the gas injection and sealing device 73, the spout attachment device 74, the bag supply device 75, and the bag supply device 76.

The spout attachment step performed by the spout attachment device 74 will be described below with reference to FIGS. 10A through 10F and FIG. 9.

When the grippers 56 grip the corner-spout attachment bags 2B stopped at the stop position II, the corner cutting device 85 (see FIG. 9) is actuated; and as shown in FIG. 10B, the corner part of the corner-spout attachment bags 2B is cut off to form a horizontal corner opening 84. The reference number 97 is a cutter.

At the stop position III, the opening device 86 is actuated; and as shown in FIG. 10C, a pair of suction cups 98 are moved forward toward the corner-spout attachment bags 2B and adhere to the sides of the bags 2B, and then the suctions cups 98 are moved back to open the corner openings 84.

Figure 10D:
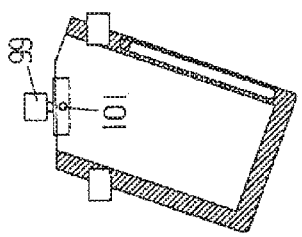

At the stop position IV, the spout insertion and temporary filling device 89 is actuated; and as shown in FIG. 10D, a spout 99 is inserted into the center of the corner opening 84 of each of the bags, and then the spout 99 is temporarily sealed to both sides of the corner-spout attachment bag 2B. In FIG. 10D, the reference number 101 is a temporary sealing point.

At the stop positions V to VII, the various sealing devices 91 to 93 are actuated; and as shown in FIG. 10E, at the same time the spout 99 is sealed to both sides of each of the corner-spout attachment bags 2B, the two sides of the corner-spout attachment bag 2B are sealed together. The reference number 102 in FIG. 10E is a heating plate.

At the stop position VIII, the cooling device 94 is actuated, and the sealed parts are cooled as shown in FIG. 10F. 103 in FIG. 10*f* is a cooling plate.

At the stop position IX, the bag discharge device 95 is actuated, two of the corner-spout attachment bags 2B (which are equipped with spouts) are received from the two pairs of grippers 56 (one bag from each pair), and these bags are arranged in two rows on the conveyor 96. On the conveyor 96, a bag group 2BF made by numerous corner-spout equipped bags 2B (bags which are equipped with spouts) is accumulated in a state that a next bag goes under a preceding bag (see FIG. 7 in Japanese Patent Application Laid-Open (Kokai) No. H8-337217), with the bags offset in the bag width direction by about one-third of the bag width. The conveyor 96 is a conveyor of a conveyor magazine, and it supplies the corner-spout equipped bags 2B (bags which are equipped with spouts) to a filling device (not shown), and the accumulated bag group 2BF is supplied directly to the filling device.

The invention claimed is:

1. A method for supplying a spout attachment bag, said method comprising the steps of:
    positioning the spout attachment bag in a horizontal orientation,
    picking up the spout attachment bag by a suction cup and lifting the spout attachment bag upward,
    transferring the spout attachment bag toward a delivery position while holding the spout attachment bag in the horizontal orientation, wherein
        one vertical plane is set as a reference plane,
        a center line of the spout attachment bag is located in the reference plane,
        the spout attachment bag is a corner-spout attachment bag,
        the suction cup is rotated centered on a vertical rotational axis,
        the vertical rotational axis of the suction cup is kept located in the reference plane, and
        the position of the vertical rotational axis when the suction cup picks up the spout attachment bag is set to a position where a corner opening vertical line that passes through a center of a spout attachment corner opening of the spout attachment bag intersects the reference plane,
    rotating the suction cup at a specific angle centered on the vertical rotational axis between a time when the spout attachment bag is picked up and when the spout attachment bag is transferred to the delivery position, and setting the corner opening vertical line of the spout attachment bag, which is at the delivery position, in the reference plane.

2. The method for supplying the spout attachment bag according to claim 1, the method comprising the steps of:
receiving the spout attachment bag by a positioning conveyor at the delivery position,
conveying the spout attachment bag parallel to the reference plane and within a horizontal plane on the positioning conveyor, and
allowing the spout attachment bag to come into contact with a stopper at a predetermined position on a conveyance path and repositioning the bag so that the corner opening vertical line of the spout attachment bag is located in the reference plane.

3. The method for supplying the spout attachment bag according to claim 1, wherein said method:
transfers the spout attachment bag that is at the delivery position toward a pair of left and right grippers of a spout attachment device in a state that the corner opening vertical line is kept in the reference plane, and
converts the spout attachment bag to a vertical orientation while the spout attachment bag is being transferred.

4. The method for supplying the spout attachment bag according to claim 2, wherein said method:
transfers the spout attachment bag that is positioned on the positioning conveyor toward a pair of left and right grippers of a spout attachment device in a state that the corner opening vertical line is kept in the reference plane, and
converts the spout attachment bag to a vertical orientation while the spout attachment bag is being transferred.

5. A method for supplying a spout attachment bag, said method comprising the steps of:
positioning the spout attachment bag in a horizontal orientation,
picking up the spout attachment bag by a suction cup and lifting the spout attachment bag upward,
transferring the spout attachment bag toward a delivery position while holding the spout attachment bag in the horizontal orientation, wherein
one vertical plane is set as a reference plane,
a center line of the spout attachment bag is located in the reference plane,
the suction cup is rotated centered on a vertical rotational axis, and
the vertical rotational axis of the suction cup is kept located in the reference plane, and
in a case that the spout attachment bag is a corner-spout attachment bag,
setting a position of the vertical rotational axis of the suction cup, when the suction cup picks up the spout attachment bag, to the position where a corner opening vertical line that passes through a center of a spout attachment corner opening of the spout attachment bag intersects the reference plane,
rotating the suction cup at a specific angle centered on the vertical rotational axis between a time when the spout attachment bag is picked up and when the spout attachment bag is transferred to the delivery position, and
setting the corner opening vertical line of the spout attachment bag, which is at the delivery position, in the reference plane;
in the case that the spout attachment bag is a center-spout attachment bag,
not rotating the suction cup, and
changing between a supply of the corner-spout attachment bag and a supply of the center-spout attachment bag by switch operation of a control device.

6. The method for supplying the spout attachment bag according to claim 5, the method comprising the steps of:
receiving the spout attachment bag by a positioning conveyor at the delivery position,
conveying the spout attachment bag parallel to the reference plane and within a horizontal plane on a conveyance path on the positioning conveyor,
allowing the spout attachment bag to come into contact with a stopper at a predetermined position on the conveyance path and repositioning the spout attachment bag,
in the case that the spout attachment bag is the corner-spout attachment bag, positioning the spout attachment bag so that the corner opening vertical line of the spout attachment bag is located in the reference plane, and
in the case that the spout attachment bag is the center-spout attachment bag, positioning the spout attachment bag so that the center line of the spout attachment bag is located in the reference plane.

7. A device for supplying a spout attachment bag, wherein
a suction cup is provided so as to be movable up and down and movable along a transfer direction of the spout attachment bag,
the spout attachment bag positioned in a horizontal orientation is picked up and lifted upward by the suction cup,
the spout attachment bag is transferred to a delivery position while being kept in the horizontal orientation;
one vertical plane is set as a reference plane,
a center line of the spout attachment bag is located in the reference plane,
the spout attachment bag is a corner-spout attachment bag,
the suction cup is rotatable centered on a vertical rotational axis,
the vertical rotational axis of the suction cup is kept located in the reference plane,
a position of the vertical rotational axis when the suction cup picks up the spout attachment bag is set to the position where a corner opening vertical line that passes through a center of a spout attachment corner opening of the spout attachment bag intersects the reference plane;
the suction cup is provided so as to rotate at a specific angle centered on the vertical rotational axis between a time when the spout attachment bag is picked up and when the spout attachment bag is transferred to the delivery position, and
said specific angle is set so that the corner opening vertical line of the spout attachment bag that is at the delivery position is located in the reference plane.

8. The device for supplying the spout attachment bag according to claim 7, further comprising a control device that adjusts, according to a top view shape of the spout attachment bag, the specific angle at which the suction cup is rotated and the position of the vertical rotational axis when the suction cup picks up the spout attachment bag.

9. The device for supplying the spout attachment bag according to claim 7, further comprising a positioning conveyor that receives the spout attachment bag and repositions the spout attachment bag at the delivery position, wherein
the positioning conveyor includes:
a conveyance path on which the spout attachment bag is placed and which conveys the spout attachment bag parallel to the reference plane, and
a stopper with which the spout attachment bag comes into contact at a predetermined position on the conveyance path of the positioning conveyor; and
the spout attachment bag is positioned by the stopper so that the corner opening vertical line is located in the reference plane.

10. The device for supplying the spout attachment bag according to claim 8, further comprising a positioning conveyor that receives the spout attachment bag and repositions the spout attachment bag at the delivery position, wherein
the positioning conveyor includes:
a conveyance path on which the spout attachment bag is placed and which conveys the spout attachment bag parallel to the reference plane, and
a stopper with which the spout attachment bag comes into contact at a predetermined position on the conveyance path of the positioning conveyor; and
the spout attachment bag is positioned by the stopper so that the corner opening vertical line is located in the reference plane.

11. A device for supplying a spout attachment bag, wherein
a suction cup is provided so as to be movable up and down and movable along a transfer direction of the spout attachment bag,
the spout attachment bag positioned in a horizontal orientation is picked up and lifted upward by the suction cup,
the spout attachment bag is transferred to a delivery position while being kept in the horizontal orientation,
one vertical plane is set as a reference plane,
a center line of the spout attachment bag is located in the reference plane,
the suction cup is rotatable centered on a vertical rotational axis,
the vertical rotational axis of the suction cup is kept located in the reference plane;
in a case that the spout attachment bag is a corner-spout attachment bag,
a position of the vertical rotational axis of the suction cup when the suction cup picks up the spout attachment bag is set to the position where a corner opening vertical line that passes through a center of a spout attachment corner opening of the spout attachment bag intersects the reference plane,
the suction cup is rotated at a specific angle centered on the vertical rotational axis between a time when the spout attachment bag is picked up and when the spout attachment bag is transferred to the delivery position, and
the specific angle is set so that the corner opening vertical line of the spout attachment bag that is at the delivery position is located in the reference plane, and
in the case that the spout attachment bag is a center-spout attachment bag, the suction cup is moved to the delivery position without being rotated.

12. The device for supplying the spout attachment bag according to claim 11, further comprising a control device, wherein
in the case that the spout attachment bag is the corner-spout attachment bag, the specific angle at which the suction cup is rotated and the position of the vertical rotational axis when the suction cup picks up the spout attachment bag is set according to a top view shape of the spout attachment bag, and
in the case that the spout attachment bag is the center-spout attachment bag, the specific angle of the suction cup is set to zero.

13. The device for supplying the spout attachment bag according to claim 11, further comprising a positioning conveyor that receives and repositions the spout attachment bag at the delivery position, wherein
the positioning conveyor includes
a conveyance path on which the spout attachment bag is placed and which conveys the spout attachment bag parallel to the reference plane, and
a stopper with which the spout attachment bag comes into contact and by which the spout attachment bag is positioned at a predetermined position on the conveyance path of the conveyor;
in the case that the spout attachment bag is the corner-spout attachment bag, the spout attachment bag is positioned so that the corner opening vertical line is located in the reference plane, and
in the case that the spout attachment bag is the center-spout attachment bag, the spout attachment bag is positioned so that the center line is located in the reference plane.

14. The device for supplying the spout attachment bag according to claim 12, further comprising a positioning conveyor that receives and repositions the spout attachment bag at the delivery position, wherein
the positioning conveyor includes
a conveyance path on which the spout attachment bag is placed and which conveys the spout attachment bag parallel to the reference plane, and
a stopper with which the spout attachment bag comes into contact and by which the spout attachment bag is positioned at a predetermined position on the conveyance path of the conveyor;
in the case that the spout attachment bag is the corner-spout attachment bag, the spout attachment bag is positioned so that the corner opening vertical line is located in the reference plane, and
in the case that the spout attachment bag is the center-spout attachment bag, the spout attachment bag is positioned so that the center line is located in the reference plane.

15. The device for supplying the spout attachment bag according to any one of claims 7 through 14, wherein
the suction cup is provided at a lower end of a vertical support shaft that allows the suction cup to rotate centered on the vertical rotational axis, and
a first drive source that moves the vertical support shaft along the reference plane, a second drive source that moves the vertical support shaft up and down, and a third drive source that rotates the vertical support shaft are provided.

* * * * *